Nov. 19, 1957  F. G. R. WARREN  2,814,040
SCAN ANTENNA
Filed July 31, 1953  3 Sheets-Sheet 1
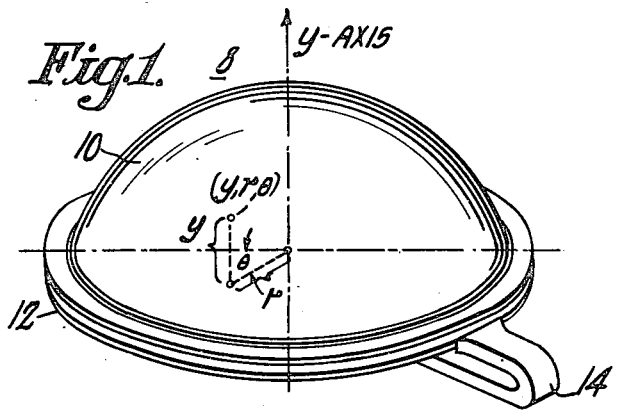
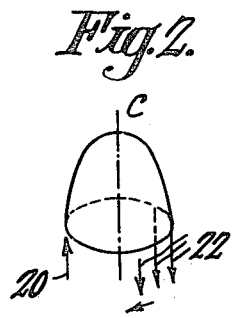
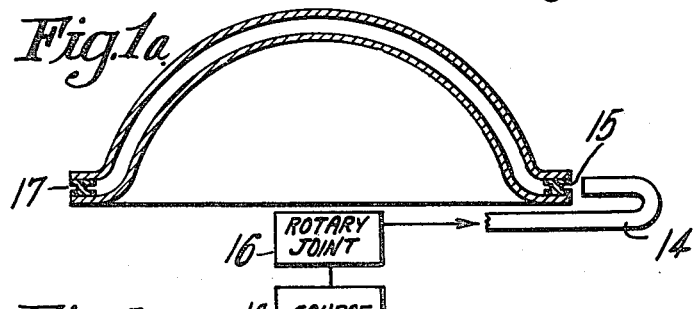
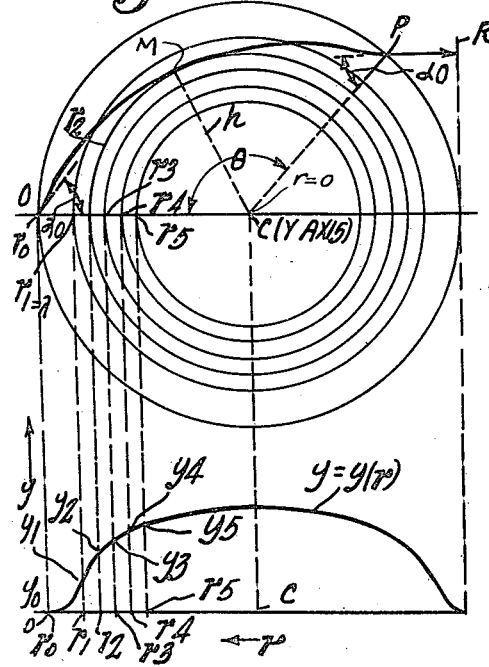
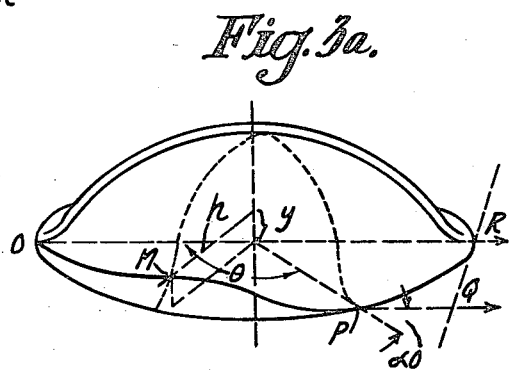
INVENTOR
Francis G. R. Warren
BY Milton S. Winters
ATTORNEY

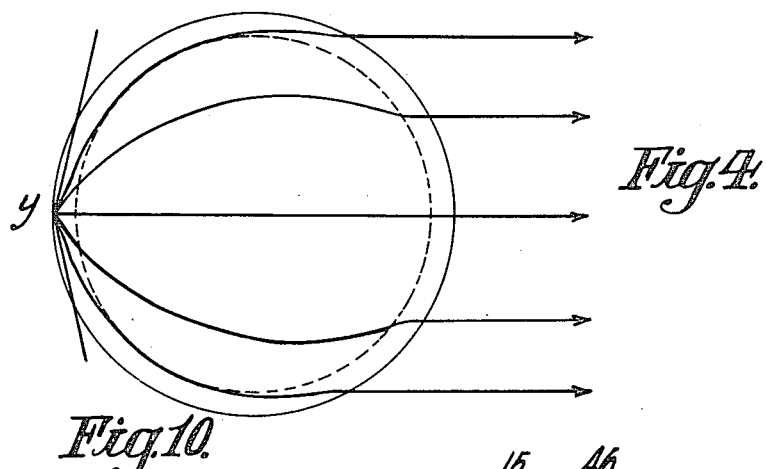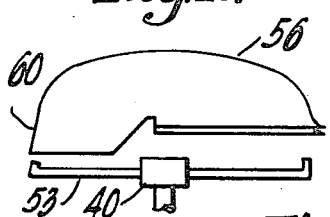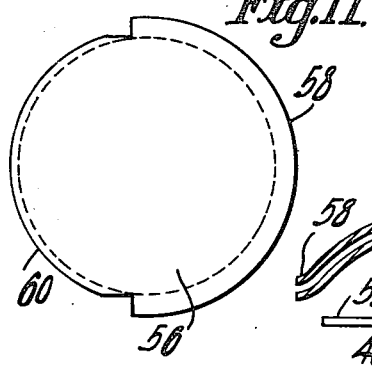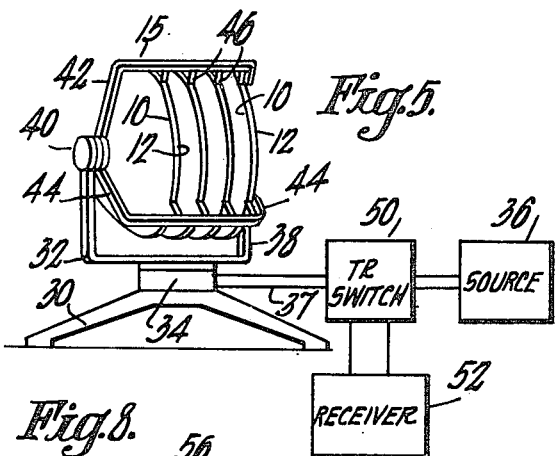

United States Patent Office 2,814,040
Patented Nov. 19, 1957

2,814,040

SCAN ANTENNA

Francis G. R. Warren, Montreal, Quebec, Canada, assignor to RCA Victor Company, Ltd., a corporation of Canada Application July 31, 1953, Serial No. 371,508

Claims priority, application Canada July 11, 1953

13 Claims. (Cl. 343—909)

The present invention is related to antennas, and more particularly to scan antennas.

It is desirable in many applications, for example certain radar apparatus, to employ an antenna which may scan continuously throughout a circle, that is, over 360°. Moreover, it is often desirable to employ an antenna for the purpose which secures the scan action by rotation of one or a few parts, light compared to the weight of the entire antenna. In this way, the circle may be scanned rapidly. Even where a 360° scan may not be desired, but when only a sector of a circle is to be scanned, antennas providing scan action with the motion of a part light compared to the entire antenna are highly desirable in many applications.

As an example of an antenna which provides a 360° scan action with the motion of a relatively light part, reference may be made to U. S. Patent 2,576,182, to Wilkinson, Jr. This antenna has a pair of dielectrically separated metallic bodies having a variable spacing. The peripheries of the bodies are substantially on a circle. The separation between the bodies is variable to cause energy with its electric polarization normal to the axis of the peripheral circle, when incident along a radial line from the axis, to focus on the circle on the same radial line prolonged through the axis to the other side of the axis. Hence the action is similar to that of a Luneberg lens. This axis is the axis of the scan action. A waveguide or the like rotated around the axis along the peripheral circle may then provide an efficient and rapid scan action, whether for reception or radiation. However, this device is operable only for energy polarized with its electric vector normal to the axis. Otherwise, the velocity variation of waves in the antenna between the bodies does not provide the requisite focusing action.

Another device, with similar action for waves polarized with the electric vector parallel to the axis is disclosed in U. S. Patent 2,576,181 to Harley Iams. This Iams device employs a dielectric body of rotational symmetry with respect to the scan axis, having a variable thickness. Although this device operates well, a metallic structure is preferred for mechanical reasons, both for ease of construction and rigidity of structure. Further, in operation, a more perfect and definite focusing action is desiable than that readily provided by this Iams lens or antenna.

Investigations have been undertaken to provide a metallic antenna having its own circular periphery as the locus of foci for waves polarized with the electric vector parallel to the axis. It has been proved that such a device exists in the mathematical sense. The construction is based on the principle of equal velocity parallel plate radio wave optics. This principle calculates geodesics of an hypothetical surface which the waves are constrained to follow. The surface of constraint is the mean surface between a pair of parallel metallic surfaces. The waves are polarized with the electric vector normal to the surface. However, since the velocity of the waves is equal everywhere on the mean surface, this device may be designed either to be operable for waves polarized normal to the axis, or for waves polarized parallel to the axis. The mean surface or surface of constraint i calculated to cause the distances of travel to be equal fo the waves to be brought to a focus. Reference may b made to the Journal of Applied Physics, volume 18, pag 211, February 1948, by S. B. Myers, and the article i the same Journal for September 1948, in which a paralle plate surface of revolution scanner is described by R. F Rinehart. Although the Rinehart scanner is theoreti cally perfect, it has one serious disadvantage in that th hypothetical surface terminates in a lip having normal normal to the axis. The directions of flow for waves a its peripheral edge are at considerable angles to the plan containing the aperture and in which the scan action i desired. The radiation is not directed along radial line in a plane normal to the axis as desired. Therefor when a radiator or receptor scans the peripheral edge poor radiation characteristics and high reflections resul The energy is not directed along a lip which include radial lines in a plane normal to the axis, as desired.

Attempts to overcome the faults of this prior antenn by adding a toroidal lip to this unaltered form either (1) If the added lip is small (small radius of curva ture) produce prohibitively high reflections; or (2) If the added lip has a larger radius of curvatur to avoid reflections, the added lip adds an extra defocus sing action to degenerate badly the radiation pattern.

The present invention overcomes this difficulty b allowing use of lip of sufficiently large radius of curvatur to avoid the serious reflections, and compensating fo the defocussing action of this lip by modification of th shape of the inner or dome portion.

The defect just mentioned is fatal to practical opera tion. Although a so-called lip may be placed on th mean surface, with corresponding lips on the paralle plates, of course, the result is not satisfactory. If the li is made with a gentle curve to smoothly join the thec retically calculated surface, the focusing action is un satisfactory, and the antenna pattern has objectionall great width. If the lip is made smaller, and with greater curvature, to smoothly join the theoretically cal culated surface, the reflections from the bend of the li are too great to give satisfactory operation.

These defects are largely overcome by the antenna disclosed in the copending joint application of Franci G. R. Warren and Stanley E. A. Pinnell, Serial Nc 371,509 entitled "Scan Antenna," which application di closes but does not specifically claim the present inven tion and is executed and filed concurrently with this ap plication.

An object of the present invention is to provide a nove antenna for high speed limited sector scan.

Another object of the present invention is to provid a parallel-plate, high-speed antenna for repetitive limite sector scan which focuses all of the energy incident fror a source placed at a circle of focus into collimated energ after passage through the antenna.

A further object of the invention is to devise an ar tenna, novel over those heretofore known, especiall adapted for cooperation with multiple rotating feed o receptor antennas for scanning a limited sector.

As disclosed in the said copending application, a pai of metallic bodies have a pair of dielectrically separate parallel surfaces. The mean surface between the metal lic surfaces has a central dome portion which is a com plete surface of revolution of a generating curve rotate about an axis. The mean surface has also a first oute lip portion which is selected or predetermined, and pref erably between about one to two wavelengths measure radially from the axis. According to the present inven tion, the said outer lip portion, the mean surface of whicl is generated by a curve rotated about the axis, has e or tangent normal to the axis at its outer extremity, is of limited angular or sectoral extent. At the arc erated by this extremity the surfaces define a first rture. On the other side of the axis from the said t lip portion, a second lip portion has a mean surface generated by a second selected predetermined curve r a limited angular extent. This second curve has its remity on a different circle from that of the circle erated by the extremity of the first selected curve. is several antenna elements for example horn feeds, equal angular spacing from each other, rotated about axis of rotation of the generating curves, and with able switching at a rotary joint by known means, can idly feed energy into the aperture defined by the tallic surfaces at the arc generated by the second pre- ermined curve. The central dome portion is shaped, suitable shaping of the generating curve, so that the paths of energy from the second lip portion aperture ough the second lip portion, the dome portion, and the t lip portion, collimates these rays and the energy as xits at the first aperture. As a feed moves along the of the second extremity, the energy scans angularly it leaves the first extremity. Since there may be mul- e, rapidly switched feeds, one at a time feeding the ond or entrance aperture, without the others in any y obstructing or interfering with the exit aperture, a y rapid scan action may be accomplished. Of course, antenna may be operated for reception in a converse nner, as will be understood by those skilled in the art, m the description thereof.

One feature of the present invention is that with a ected radius of the second extremity from the axis, of the energy which enters between the metallic sur- es from a feed (or to a receptor) having itself an rgy pattern within 180° is perfectly focused, in theory. wever, in other embodiments, the radius of the second remity may be different from this selected one. Then least a major portion of the energy within a feed pat- n of less than, but merely 180°, may be perfectly used. Compensation may be secured by shaping the d to have a pattern restricted to a lesser angular extent n 180°, or without compensation, the energy not per- tly focused may be, for practical purposes, unim- tant.

The foregoing and other objects, advantages, and vel features of the invention will be more fully appar- from the following description when taken in connec- n with the accompanying drawing, in which like refer- e characters refer to similar parts, and in which:

Fig. 1 is a perspective view of a scanner as disclosed the said Warren and Pinnell joint application and which a complete surface of revolution for the mean surface ween the metallic bodies; and Fig. 1a is a cross-sectional view in a plane through axis of rotation of the generating curve of the mean face of Fig. 1;

Fig. 2 is a schematic view of the prior art suggestion lstrating its principal defect;

Fig. 3 is an explanatory geometric figure showing a w of the mean surface of the embodiment of Fig. 1 d a geodesic projection on a plane normal to the axis d also a view immediately below in a plane radial to axis, shown together to aid in understanding the man- in which the generator of the mean surface for Fig. 1 alculated;

Fig. 3a is a geometrical figure illustrating the meaning mathematical symbols employed in calculating the ired mean surface;

Fig. 4 is a view of the same mean surface projected a plane normal to the axis illustrating the ray paths energy flow;

Fig. 5 is a perspective view of a plurality of antennas e that of Fig. 1 arranged coaxially and for elevation tor scan;

Figure 6:
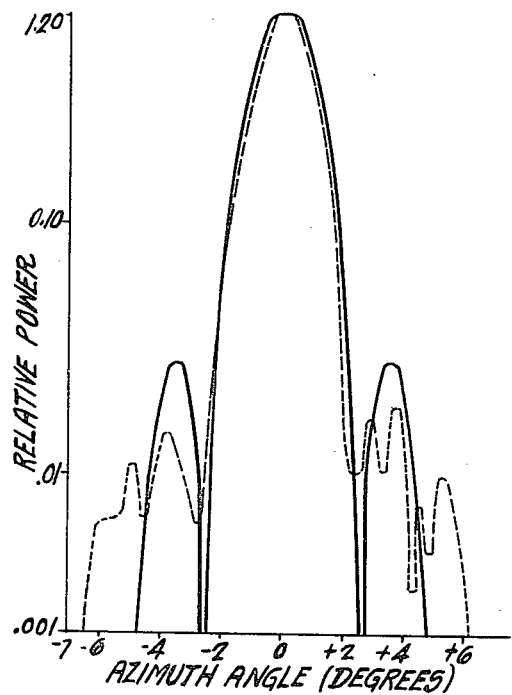
Figs. 6 and 7 are graphs showing antenna patterns of one embodiment of the invention.

Figs. 8 and 9 are respectively a cross-sectional view in a plane including the axis and a bottom view of one embodiment of the present invention especially suited for sector scan wherein an additional or extra lip faces par- allel to the axis, and multiple feeds may be employed to feed this extra lip; and Figs. 10 and 11 are respectively side elevational and bottom views of another embodiment of the invention especially suited for sector scan in which one antenna lip is parallel to the antenna axis and another is perpen- dicular thereto.

The actual shape of the mean surface is found by applying the principle that the radiation flows along geo- desics on the mean surface between the parallel plates. This surface must be so bulged in the center that all geodesic paths across the surface from any point on the circle of focal points to a straight line tangent to the circumference on the opposite side are equal in length. This straight line then is a phase front for the beam pro- duced by a source of radiation at that point and the beam therefore consists of essentially parallel radiation. The aperture is a circular arc along the base of the sur- face opposite the feed point. Calculation of such a sur- face, as in the Journal of Applied Physics Article men- tioned above, to focus all rays on the surface, results in a shape which is vertical at the circumference as illustrated in Fig. 2. This would require that the beam, in order to obtain scanning, be deviated sharply through a right angle into the horizontal plane. A sharp bend would introduce reflections and a high standing wave ratio. Addition of a slow bend to the surface already calculated introduces additional convergence which destroys the focussing con- ditions. By beginning the surface, however, with a lip horizontal at the outer circumference and curving suffi- ciently slowly, and by not requiring focussing of the extreme rays which stay within the lip only, an inner surface may be calculated which focusses perfectly all rays passing onto it from a point on the outer circumfer- ence of the lip. That is, the surface corrects for the focussing action of the lip. Incorporation of the lip into the solution provides a device improved over prior devices.

*Scan antenna with complete circular symmetry*

The method of scanning with the embodiment of the invention shown in Figs. 1 and 1a is to feed the radiation into the space between the conducting surfaces from a waveguide 14 (which may terminate in a horn) or other feed on the circumference or feed circle and move the feed around the circumference. For simplicity radiation scanning is considered here, but the fact that the reception pattern will be the same in scanning is known to the art. This feed revolves about the axis of symmetry of the antenna and is connected to the fixed components of the R.-F. (radio-frequency) system, including a source 18, by means such as a rotary joint 16 on the axis of the sys- tem. Now a surface of revolution system for 360° pre- sents the same contours no matter from what direction it is viewed on the feed circle. This means it has the same focussing properties no matter what the position of the feed on the feed circle and the characteristics of the beam do not change in any respect during the scanning process. In other words "off-axis" aberrations are completely ab- sent because the beam is always effectively "on-axis." The antenna of Fig. 1 is a complete surface of revolution system. Modifications are possible which are only in part surface of revolution systems and which therefore lose their optical perfection at some point in the 360° scan. With such limited angle scanning systems, however, it is possible to retain effective axial symmetry over the por- tions of the surface covered by the radiation during the useful portion of the scan.

Some important advantages of the scanner of Fig. 1 reside in the combination of high scanning speed potentialities with the absence of off-axis aberrations and the possibility of full 360° scan. No other scanner combines all these features. A rotating parabola is optically perfect in the same sense that this scanner is, but the large mass and wind resistance of a parabola make high speeds of rotation and hence high scanning speeds impossible. With the scanner of Fig. 1, however, scanning is accomplished by revolution of the feed only, and as the feed may consist essentially of a light member, usually a waveguide, very high speeds of revolution are possible. Thirty revolutions per second is a reasonable rate for a model one meter in diameter. On the other hand, for a parabola of equivalent beam width, one rotation per second would probably be the upper limit of the speed of rotation. The shape of the present preferred embodiment lends itself well to mass production methods such as stamping or electroforming. An estimate of tolerances indicates that careful spinning produces satisfactory surfaces.

A number of other scanners having a stationary focussing system with a more or less light revolving primary feed are capable of scanning speeds as high as is this scanner but these are all limited in angle of scan and are all subject to a certain degree of off-axis aberration. The Foster scanner (see U. S. Patent 2,521,844) is probably the best all round performer among these other scanners.

Even for limited angle or sector scanning applications, the present scanner has the advantage of high optical performance with scanning speed at least as high as any other type. One such sector scanning application would be the use of three feeds to the system spaced at 120° to one another and fed from a three-way rotary microwave switch giving a 120° sector scan (Fig. 5). The beam emerges between the two feeds which are not at the moment energized. The scanning repetition rate in this case is three times the rate of revolution of the feed system. The streamlined shape of the present scanner and the sheltered position of the feeds is of considerable advantage in applications where wind resistance is an important factor. The arrangement of Fig. 5 is described more fully hereinafter.

The two conducting surfaces of revolution of the metallic bodies 10, 12 (Figs. 1 and 1a) are so formed that when placed coaxially with and facing one another they are everywhere separated by the same perpendicular distance. These two surfaces and the space separating them form a parallel plate transmission system for microwaves. The order of magnitude of the space separating them is determined by the wavelength to be used. The guiding principle in deriving the shape of such surfaces is that microwaves are propagated between them along geodesics on the mean surface between the plates. The mean surface is the imaginary surface lying half-way between the actual surfaces measuring along their common normal. The condition for production of the narrowest (best collimated) beam is that the disturbance, after leaving the system, have a phase front which is a straight line perpendicular to the direction of progapation. This means that the optical distances from a source point on the circumference of the system to a straight line tangent to the circumference at the point diametrically opposite the source must be the same measured along the geodesic paths for all rays leaving the source point (see Fig. 3 or 4). In a sense, the result is a path length lens.

The approach used to calculate the shape of the desired mean surface for the device of Fig. 1 is to start with a curved lip chosen to satisfy the requirement for low reflections. The focussing properties of this lip are then taken into account in constructing the surface which is built up by a method of approximation which amounts to building up the surface as a series of conical slices, the slope of each cone being chosen to focus the ray leaving the source at a particular angle. The number of cones sufficient to give a smooth surface on construction is chosen. The lip must be kept as small as possible consistent with the requirements for low standing wave ratio since those rays which travel only within the lip cannot be focussed. Fortunately, as these are the rays leaving the source at very large angles, their intensity, even from an unshaped waveguide feed, is sufficiently low to be negligible for reasonable lip sizes. If the feed termination is shaped, as in Fig. 1, the large angle rays are easily made negligible for any practical purpose.

Having obtained the proper shape of the mean surface the shapes of the actual surfaces may be easily derived from the requirement that they are everywhere separated from the mean surface by a given perpendicular distance. For a system using the TEM mode, the plate separation may be anything less than half the wavelength to be employed. Generally, it will be as large as possible, that is near to a half wavelength, to increase the power handling capacity at the point of feeding.

It should be pointed out here that for a system to be used in the TEM mode, the shape of the mean surface to produce phase rectification is entirely independent of frequency or of scale. The only reason that the same shape of the actual surfaces cannot be scaled directly for wavelengths differing by orders of magnitude or for widely differing overall dimensions at the same wavelength is that in general it would not be desirable to scale the plate spacing in the same ratio as the other dimensions. The shape of the mean surface itself can, however, be scaled directly and from this it is a simple matter to calculate actual surface shapes. Often, however, it might be desirable to recalculate the shape of the mean surface a direct scaling might produce a lip larger or smaller than necessary because standing wave requirements would ask for a lip no larger on a large model than on a small model at the same wavelength.

Given an antenna which produces perfect phase rectification, the bandwidth is not a function of the particular antenna but rather of the size and shape of the aperture and the distribution of illumination along the aperture. The antenna of Fig. 1 differs from most other microwave antennas in that its aperture is an arc of a horizontal circle rather than a straight line. Theoretical predictions borne out by experimental results show that the pattern in a plane normal to the axis is essentially the same as that produced by a straight aperture of the length of the arc projected on a straight line perpendicular to the direction of propagation and having corresponding illumination.

Figure 7:
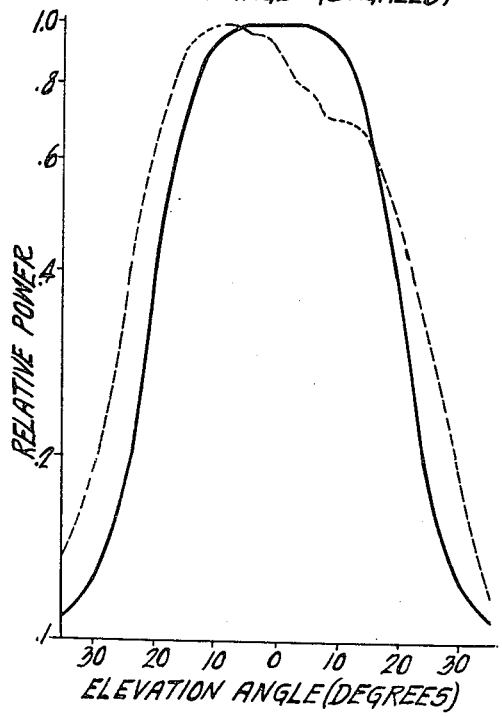

On the other hand, the vertical pattern of the circular arc aperture is considerably narrower than would be given by a straight aperture of the same height, that is less than half a wavelength. This is due to the component of length of the aperture in the direction of propagation producing a type of end-fire effect in the vertical pattern. Calculated horizontal and vertical patterns at 0.86 cm. free-space wavelength for a 9.5 inch model of the antenna with 90% effective aperture assuming a $\cos^2 \alpha$ amplitude taper on the primary feed pattern are given in Figures 6 and 7 in solid lines with typical experimental patterns in dotted lines superimposed for comparison.

A major problem of any parallel plate system is that of maintaining the plate spacing within the required limitations without degrading the pattern. This requires that if spacers be placed in the path of the radiation in the system, they must not appreciably reflect or deflect the radiation incident on them or appreciably change its phase.

If the antenna is to be modified for limited angle scanning there are certain regions of the circumference through which no energy passes. It is possible to put spacers, of metal if so required, in these regions. The spacing problem in this case then is not difficult. If the 360° scanning feature is to be retained, however, all parts of the surface are from time to time illuminated so that spacers of some suitable type must be used. On roach is to use small discrete spacers (not shown) ch necessarily disturb the physical symmetry (except he case of a single centrally located spacer), and rely pletely upon the perfection of their electrical design "invisibility" to avoid disturbance of the pattern. far as possible, the "invisibility" of the spacers should maintained during the whole scanning cycle for all ctions of incidence of the radiation. Several types 'non-reflecting" spacers have been designed by various kers in the field of parallel plate optics. For example, such a spacer is disclosed in U. S. Patent 2,528,367 Iams.

\n annular ring 15 of dielectric, as shown in Fig. 1a, y be employed as a spacer. This ring may be made any suitable dielectric, for example, Plexiglas or styro m, but preferably having near unity index of refraction. The radial thickness of the ring is selected at one rter wavelength (in the dielectric), to reduce reflections. The annular ring introduces an aberration, although a small one. As shown hereinafter, however, ount may be taken in the mean surface to reduce this rration. Reflections may be further reduced by an ular slot, such as 17, in the outer edge of the annular cer 15, or a slot in both outer and inner edges as wn.

t may be noted here that the antenna of Fig. 1 has advantage in low wind loading due to the rather amline shape and the low power requirements in ning the relatively light feed system. Moreover, the dwidth of the antenna for polarization (always reing to the electric vector) parallel to the axis is h in theory and in practice exceedingly broadbanded.

*Plurality of coaxial scan antennas (Fig. 5)* n Fig. 5 is shown another embodiment of the invenl which employs a plurality of antennas 8 of the type wn in Fig. 1, but each having a plurality of feeds l arranged coaxially with each other. The arrangent of scanners is supported by a base 30. The menical support includes a waveguide arm 32 supplied ough a rotatable joint 34 with energy from any suite source 36 as through a waveguide 37. The wavede 32 may be the mechanical support or arm, from base, to support the structure at one axial end. The er axial end is held by an arm 38. The waveguide l 32 terminates at a rotating joint and switch 40, any suitable known form, which distributes the energy m arm 32 selectively to three feed waveguides only ) of which, 42 and 44, are visible. Each of the feed veguide arms as 42, 44 receives energy only when it upies the lowest 120° sector of its total rotation. ch feed waveguide has small antenna elements, such branch waveguides or horns, 46, which may be like t terminating waveguide 14 of Fig. 1. Each of horns is suitably coupled to the feed arm carrying it and h is associated with one of the antennas. Each of horns 46 abstracts a portion of the energy from its d arm. Each feed arm as 42, 44 may be terminated energy absorptive means (not shown because such ans are well known) at their end portions remote from joint and switch 40. The horns 46 and the antennas re separated axially by a wavelength in the feed wavede to which it is coupled so that each horn 46 is fed in se with any other coupled to the same feed wavede arm. Separation may also be other distances pro- ed known means are employed to keep such in-phase tionship. If the beam is to slant, and a conical secl swept by the axis of the antenna pattern, a different se relation may be employed.

n operation, consider first a single one of the antennas and its multiple feed horns 46. As the feed arm rying each horn reaches the lowest 120° sector, the n feeds the antenna 8. As rotation of the arm and horn 46 carried by it continues, the emergent energy eps a sector of 120°. It will be understood that in practice the sector must be somewhat less to allow for switching. As the next feed arm assumes the lowest 120° sector, the same sector is swept again. If the rate of rotation is constant, the sector is swept successively over the upper 120° sector, each time at a constant angular velocity. Thus the repetition and sweep rate may be made very high. The orientation shown makes for a substantially hemispheric search pattern, although other orientations may be employed, for example with the axis vertical for horizontal sector scan. If it is desired to have a radiation pattern narrow in a plane including the common axis of the antenna, in the device as shown in Fig. 5, then a plurality of antennas is employed in the arrangement shown. Also, by rotation about the axis normal to the common axis of antennas 8 and by rotation of the first rotatable joint 34 the plane in which the sweep occurs may be turned at will about the vertical axis of rotation of this first joint 34. Of course, the reception pattern of the arrangement is the same as the radiation pattern. There may be included, as in typical radar (radio echo detection and ranging) apparatus, the usual TR switch 50 and receiver 52, with source 36 as a pulse source. Then the reception and radiation patterns are both employed to advantage. The source 36, TR switch 50, and receiver 52 may also be used in Fig. 1, to replace the source 18, and the waveguide 37 may then lead to the rotating joint 16 in a manner which will be readily understood by those skilled in the art.

*Computation of mean surface (Figs. 3 and 3a)*

In order to show how to compute the desired geodesic surface to construct the antenna of Fig. 1, consider a surface of revolution obtained by revolving a curve $y=y(r)$ about the y-axis, as in Fig. 3a. Through any point $(r_1, \theta_1, y(r_1))$ expressed in cylindrical coordinates there exists in any direction a unique geodesic which satisfies an equation of the form $$\sin \alpha = h/r \qquad (1)$$

where $\alpha$ is the angle at which the geodesic cuts the meridian plane (the plane including the y-axis) at the point and $h$ is a parameter which characterizes the particular geodesic. The meridian plane includes the axis of revolution (y-axis) and also the point $(r_1, \theta_1, y(r_1))$. The Formula 1 is easily derived. It is due to Clairaut and is known in differential geometry. The parameter $h$ is the distance of closest approach of the particular ray to the y-axis.

The geodesic distance to another point $(r_2, \theta_2, y(r_2))$ is given by $$S = \int_{r_1}^{r_2} \left| \frac{(1+y'^2)^{1/2}}{(r^2-h^2)^{1/2}} r \, dr \right| \qquad (2)$$

where $y' = dy/dr$. The total change in polar angle along the geodesic is $$\theta_1 - \theta_2 = h \int_{r_1}^{r_2} \left| \frac{(1+y'^2)^{1/2}}{r(r^2-h^2)^{1/2}} dr \right| \qquad (3)$$

The geodesic distance given by (2) is the minimal path between the two points, that is, the path that a frictionless string stretched between them would take up if constrained to lie everywhere in the surface, or the path of least time of travel. The assumption of the propagation of electromagnetic waves along geodesics in the parallel plate equal velocity structures is a natural consequence of Fermat's principle in optics.

If, on the geodesics through a focus, points are taken at equal geodesic distances from it, the focus of the points is an orthogonal trajectory of the geodesics. This is equivalent optically to saying that the wavefronts are normal to the direction of propagation, so that in the case of a plane parallel beam they become straight lines. It can be shown that where a geodesic crosses a sharp bend it makes the same angle with the bend on both sides of it.

The form visualized for the mean surface of the surface of revolution lens or antenna 8 is shown in Fig. 3a. A projection on a plane normal to the axis, Fig. 3, aids in understanding the geometry. Rays from the focus at O pass over the surface traveling along geodesic paths. The shape of the surface is required to be such that the rays emerge as a parallel beam in the plane of the base circle.

Consider a general ray as shown in Fig. 3, which leaves O making an angle $\alpha_0$ with the meridian given by:

$$\alpha_0 = \sin^{-1} h/r_0 = \sin^{-1} h \quad (4)$$

$r_0$ may be taken as unity, without loss of generality. This ray cuts the meridian at right angles at some point M which is at the minimum distance $h$ from the central axis. This ray makes the same angle $\alpha_0$ with a meridian plane at the aperture circle, $r=r_0$ at either the point where it enters or the point where it leaves. As $y'(r)=0$ at $r=r_0$, a radical line through the point of entrance O or of emergence P also meets the ray at the angle $\alpha_0$. Thus, the condition that the general ray should be parallel to the central ray (in the plane of the base circle) is that for $\theta$ at the point P of emergence, $$\theta = \pi - \alpha_0 \quad (5)$$

The value of this $\theta$ may be obtained from Equation 3, bearing in mind that $r$ is decreasing along the geodesic from O to M and increasing from M to P so that Equation 5 may be written $$h \int_O^M \left| \frac{(1+y'^2)^{1/2}}{r(r^2-h^2)^{1/2}} dr \right| + h \int_M^P \left| \frac{(1+y'^2)^{1/2}}{r(r^2-h^2)^{1/2}} dr \right| = \pi - \sin^{-1} h \quad (6)$$

taking $r_0$ as unity.

Or:

$$2h \int_h^1 \left| \frac{(1+y'^2)^{1/2}}{r(r^2-h^2)^{1/2}} dr \right| = \pi - \sin^{-1} h \quad (7)$$

This condition may be reformulated in terms of path length of the rays. Parallelism of the emergent beam requires emergent wavefronts which are straight lines normal to the direction of propagation. In other words, referring again to Figs. 3 and 3a, the focussing requirement is that the geodesic length OMP out to the tangent through R be independent of $h$. That is:

$$2 \int_h^1 \frac{(1+y'^2)^{1/2}}{(r^2-h^2)^{1/2}} r \, dr + (1 - \cos \alpha_0) = K \quad (8)$$

It may be shown that the generating curve under these conditions, and therefore the generated surface has a tangent, normal to the axis at $r=0$, i. e. $y'=0$ at $r=0$. This means that the surface does not come to a point or cusp, which point or cusp would cause poor electrical characteristics for the antenna.

From the electrical point of view, what is required is a surface with a horizontal lip curving upwards to join the central cap, the curvature everywhere being small enough to conform to good waveguide practice. Although such a surface cannot focus all rays over it from a point on the feed circle, a surface focussing all rays for which $h/r$ is less than some fraction $\lambda$ (an arbitrary value not to be confused with wavelength) which is only slightly less than unity is quite satisfactory in focussing action. The effective aperture of such a system would be $2\lambda r_0$ which would result in a slight increase of feed circle to aperture ratio; its performance as far as focusing alone is concerned, is substantially as good as that of the ideal solution, provided $\lambda$ is near unity, but there is a great improvement in other performance aspects. The generating curve $y(r)$ may be taken equal to $f_1(r)$ in the interval between 1 and $\lambda$ and equal to $f_2(r)$ for $r$ less than $\lambda$. It may be noted here that for a horn presenting a point source at a point removed farther from the antenna axis than the radium of the periphery, the generating curve may be taken as a straight line between the apparent source and the real peripheral radius.

There exist an infinite number of such surfaces. It is desired to establish a relation connecting the shape of the central surface with that of the predetermined outer lip. To do this, consider the solution surface in two sections as already suggested, an outer lip extending inwards from $r=1$ to $r=\lambda$, and an inner surface extending from $r=\lambda$ to $r=0$. Suppose that for the lip the arc length of the generator is given by $$ds_1 = (1+y'^2)^{1/2} dr = f_1(r) dr \quad (9)$$

and for the inner surface by $$ds_2 = (1+y'^2)^{1/2} dr = f_2(r) dr \quad (10)$$

Then from (7) it is desired that:

$$2 \int_\lambda^1 \frac{h f_1(r) dr}{r(r^2-h^2)^{1/2}} + 2 \int_h^\lambda \frac{h f_2(r) dr}{r(r^2-h^2)^{1/2}} = \frac{\pi}{2} + \cos^{-1} h \quad (11)$$

for all values of $h$ between $h=0$ and $h=\lambda$. This can be simplified somewhat by defining $\phi_1(r)$ and $\phi_2(r)$ such that $$\left. \begin{array}{l} f_1(r) = \frac{1}{2}\{1+\phi_1(r)\} \\ f_2(r) = \frac{1}{2}\{1+\phi_2(r)\} \end{array} \right\} \quad (12)$$

Substituting, we get:

$$\int_\lambda^1 \frac{h\phi_1(r)dr}{r(r^2-h^2)^{1/2}} + \int_h^\lambda \frac{h\phi_2(r)dr}{r(r^2-h^2)^{1/2}} + \int_h^1 \frac{h\,dr}{r(r^2-h^2)^{1/2}} = \frac{\pi}{2} + \cos^{-1} h \quad (13)$$

which reduces to $$\int_\lambda^1 \frac{h\phi_1(r)dr}{r(r^2-h^2)^{1/2}} + \int_h^\lambda \frac{h\phi_2(r)dr}{r(r^2-h^2)^{1/2}} = \frac{\pi}{2} \quad (14)$$

Now introduce $\Omega(r)$ such that $$d\Omega(r) = \frac{\phi_2(r)dr}{r} \quad (15)$$

and re-arrange so that we have $$\int_\lambda^1 \frac{h\phi_1(r)dr}{r(r^2-h^2)^{1/2}} - \frac{\pi}{2} = -h \int_h^\lambda \frac{d\Omega(r)}{(r^2-h^2)^{1/2}} \quad (16)$$

This is an integral equation of the general form $$g(h) = -h \int_h^\lambda \frac{d\Omega(r)}{(r^2-h^2)^{1/2}}, \quad 0 \leq h \leq \lambda \quad (17)$$

which may be shown (R. K. Luneberg, Mathematical Theory of Optics, Brown University, Providence, R. I.—Mimeographed, 1948, p. 211) to have as solution $$\Omega(r) - \Omega(\lambda) = \frac{2}{\pi} \int_r^\lambda \frac{g(h)dh}{(h^2-r^2)^{1/2}} \quad (18)$$

Applying this inversion theorem to (16), the solution is $$\Omega(r) - \Omega(\lambda) = \frac{2}{\pi} \int_r^\lambda \frac{\left[ \int_\lambda^1 \frac{h\phi_1(r)dr}{(r^2-h^2)^{1/2}} - \frac{\pi}{2} \right] dh}{(h^2-r^2)^{1/2}} \quad (19)$$

Differentiating this expression gives $d\Omega(r)$ so that $\phi_2(r)$ is implicitly determined once $\phi_1(r)$ is known. That is for every outer lip there exists an inner surface which will focus all rays which pass to it from the outer point though there is nothing to indicate that the solution
represents a real surface. In order that it be real some
restriction must be placed on the function $\phi_1(r)$. One
condition, at least, that it must fulfill is that $$\int_\lambda^1 \frac{\lambda \phi_1(r) dr}{r(r^2-\lambda^2)^{1/2}} = \frac{\pi}{2} \quad (20)$$

The slope of the generator is to be continuous at $r=\lambda$.
This can be seen from (16) by letting $h$ approach $\lambda$.
While Equation 19 represents a solution, it is of little
value for the required integrations are extremely difficult,
if not impossible, for suitable assumed forms of $\phi_1$.
Furthermore, the usual methods of approximation are
of little use here, since both the inner and outer integrals
may be unbounded at one limit of integration. As a
result, it is ordinarily better to deal with Equation 11
directly and to use some means of approximating the
desired curve. One convenient manner of procedure
follows.

The general character, although not the exact form, of
the lip is fixed by the curvature requirements of avoid-
ing reflections and high standing wave ratio in bringing
the radiation into a horizontal plane. The generator of
the lip must be horizontal at the outside radius, the
focussing condition must be met for the ray having
$h$ equal to the inner radius of the lip and at no point in
between must the curvature exceed that allowed by good
waveguide technique. A further consideration is that
the functional form of the generator be such as to give
an integrable form for the geodesic angle and length
integrals, to avoid the labor of extended computation.
Within the inner boundary of the lip, in order to focus
the rays which pass over the central surface from the
edge the central surface must have a generator for which
$dy=f_2(r)dr$, such that the condition of Equation 11 is
met. Then for a suitable lip resort may be had to
methods of approximation to find $f_2(r)$. Building up the
generator progressively in linear segments proved the
most satisfactory procedure and was the method used in
the derivation of the surface used in an actual antenna
built and satisfactorily operated.

Linear segments were used in the building up of the
generator curve rather than curved segments as trials
showed that equivalent accuracy in meeting the focussing
requirements could be obtained with much less work.
Intuitive reasoning suggests that a toroid would be the
most suitable form of lip since the curvature is constant
and the lip can be made as small as possible without
exceeding curvature requirements. The polar angle $\theta$
traced out by a ray in traversing the toroidal lip may
be evaluated by approximate means or by exact means.
However, the usual approximations give inaccurate re-
sults for those rays for which $\theta$ is close to $$\frac{\pi}{2}$$

In the present example, an approximately toroidal lip
for which the exact angular integral could be obtained,
was employed, because the exact integral for the toroid
was found only after the computations were completed.
The form of generating curve adopted for the lip is
given by $$f_1(r) = (1+y'^2)^{1/2} = 1 + \frac{1}{2}\left(\frac{x}{c}\right)^2 + \frac{3}{8}\left(\frac{x}{c}\right)^4 \quad (21)$$

where $c$ is a constant and $x=r_0-r$.
It is seen that this expression is obtained from binomial
expansion of the corresponding expression $$f(r) = (1+y'^2)^{1/2} = \left(1-\left(\frac{x}{c}\right)^2\right)^{-1/2} \quad (22)$$

for the exact toroidal lip, the series being terminated at
the third term. The curvature of this generator has a
maximum value of $$\frac{1}{c} \text{ at } r=r_0$$

and falls off gradually for $r<r_0$. Further terms in the
binomial expansion would give a closer approximation to
a circular generator, but the labor involved in subsequent
calculations becomes prohibitive.

To ensure maximum aperture to feed circle ratio the
constant should be chosen so that the value of $$\frac{1}{c}$$

is at the maximum permitted by good waveguide prac-
tice. The lip is then completely determined when its
inner radius $\lambda r_0$ is specified. This is done by requiring
that the ray for which $h$ equals $\lambda r_0$ be focussed by
the lip, i. e.

$$\theta = \frac{\pi}{2} + \cos^{-1}\lambda, \quad \text{for } h=\lambda r_0 \quad (23)$$

In the actual device, $r_0$ was fixed at 4.75 inches, the larg-
est radius that could be swung on a precision lathe avail-
able, to give the largest possible aperture, and the wave-
length was chosen as 0.86 cm. Following this procedure
for $c$ of the order of one wavelength gave a value of $\lambda$ in
the vicinity of .9. It was then decided to fix $\lambda$ at 0.90 and
adjust $c$ to focus the ray for which $h=\lambda r_0$.

For convenience the calculations were made on the
basis of unit radius and the results scaled to an outer
radius of 4.75 inches. This is permissible as the focussing
properties are independent of scale, and in the following
discussion we will take $r_0=1$. For the purpose of this
model then, the unit of measurement was 4.75 inches.

Having determined the form of $f_1(r)$ for the lip, the
expression for the polar angle traced out by a ray in
traversing the lip, $$\theta = \int_\lambda^1 \frac{h f_1(r) dr}{r(r^2-h^2)^{1/2}} \quad (24)$$

was integrated and the resultant function evaluated for all
values of $h$ desired, that is for every value of $h$ for which
the focussing condition was to be applied in subsequent
calculations for the central surface. These calculations
were rather complex and had to be carried out to eight
significant figures to achieve four figure accuracy in the
final result. As a rough check, the values of $$\frac{\Delta\theta}{\Delta h}$$

were plotted on large scale graph paper, deviations from
a smooth curve indicating an error in the calculations
which could then be corrected.

These values of $\theta_h$ were then used in determining the
shape of the central surface by the methods described
hereinafter.

As the form of $y=f(r)$ for the lip could not be readily
derived from $$(1+y'^2)^{1/2} = f_1(r) \quad (25)$$

by integration with this form of $f_1(r)$, mechanical integra-
tion using the planimeter was employed.

In the region $r<\lambda$, the surface should be so shaped
that all rays which pass over it are brought to a focus.
The required generating curve can be approximated in a
number of ways. The second integral of Equation 11
should be evaluated exactly, if possible (as indicated in
this example), to avoid errors in approximate integration.
Another factor is that in most of the numerical work the
final value of $\theta$ is a result of cancellations of relatively
large values, so that eight and sometimes nine significant
figures should be carried to achieve sufficient accuracy.
The method of approximation described was selected be-
cause it allowed the second integral of Equation 15 to be evaluated exactly and seemed to give the highest accuracy for a given expenditure of time in calculation.

Satisfactory results are obtained by approximating the required curve with a number of separate segments, and by sufficiently restricting the range of each segment. One good method is to construct the curve as a polygonal arc using a large number of straight segments, the slopes of these segments being adjusted so as to focus those rays which just touch the circles generated by the ends of the segments. This was done by determining first the slope of the outer interval and working toward the axis, step by step. Fitting for $h$ at the end point of the segment turns out to be satisfactory and simpler than some other possible methods.

The intervals were made sufficiently small that the straight segments departed from a smooth curve drawn through their end points by less than one mil which was better than the accuracy anticipated in machining. This was checked from the first two segments calculated, since in this section the curvature of the generator was found to be the greatest. For our model, the range from $.9 \geq r \geq .85$ was divided into 10 equal intervals, while the range from $.85 \geq r \geq .8$ was divided into equal intervals.

Suppose these intervals are labelled in sequence $I_1, I_2 \ldots I_{15}$, starting with the outer interval. Since the slope $y'$ is constant along each segment, constants $k_1, k_2, k_3 \ldots k_{15}$ can be assigned to the values of $(1+y'^2)^{1/2}$ in the corresponding intervals. To determine $k_1$, the requirement is that the ray for which $h=.895$ should be focussed.

Hence from Equation 5 we require:

$$2\int_{1}^{.895} \frac{.895(1+y'^2)^{1/2}dr}{r(r^2-.895^2)^{1/2}} = \frac{\pi}{2}+\cos^{-1}.895 \quad (26)$$

The integral can be split up into two sections, that over the lip where $1 \geq r \geq .9$, and the other over the interval $I_1$ where $$(1+y'^2)^{1/2} = k_1 \quad (27)$$

The former is $\theta_{.895}$ (the value of $\theta$ in the lip for $h=0.895$) which was previously calculated. Thus, we have:

$$2\int_{.895}^{.9} \frac{.895\, k_1 dr}{r(r^2-.895^2)^{1/2}} = \frac{\pi}{2}-\cos^{-1}.895-\theta_{.895} \quad (28)$$

or $$2k_1 \cos^{-1}\left(\frac{.895}{.9}\right) = \frac{\pi}{2}+\cos^{-1}.895-\theta_{.895} \quad (29)$$

which determines $k_1$.

In the interval $I_2$ where $(1+y'^2)^{1/2}=k_2$, the ray for which $h=.89$ should be focussed, that is $$2\int_{.895}^{.9} \frac{.89 k_1 dr}{r\{r^2-(.89)^2\}^{1/2}}+2\int_{.89}^{.895} \frac{.89 k_2 dr}{r\{r^2-(.89)^2\}^{1/2}} = \frac{\pi}{2}+\cos^{-1}.89-\theta_{.89} \quad (30)$$

or $$2k_2 \cos^{-1}\frac{.89}{.895} = \frac{\pi}{2}+\cos^{-1}.89-\theta_{.89}-$$
$$2k_1\left[\cos^{-1}\frac{.89}{.9}-\cos^{-1}\frac{.89}{.895}\right] \quad (31)$$

which fixes the value of $k_2$ since $k_1$ is already known.

Continuing this process for each value of $h$ down to $h=.8$, all of the $k$'s were determined. From these, the value of $y'$ $$\left(\text{that is, } \frac{dy}{dr}\right)$$

in each segment was calculated and the curve constructed over this range. As the $k$'s were calculated, they were plotted against $h$. The fact that this gave a smooth curve served as a rough check of the calculations, since the previous values could be extrapolated to give an approximate result for the next segment.

This method of approximating the generating curve could be extended to cover the whole central region, but the number of segments would be rather large and the calculations would become progressively more laborious. Fortunately, any one of a large number of functions could be adjusted to satisfy by approximation the focussing condition over fairly extensive ranges in the section corresponding to $r \leq .8$. The most successful of these was of the form $$f_2(r) = (1+y'^2)^{1/2} = \frac{1}{2}\left[1+\left\{1-\left(\frac{r}{c}\right)^2\right\}^{-1/2}\right] \quad (32)$$

where C is an adjustable constant. It will be seen that this is half the sum of the functions giving $(1+y'^2)^{1/2}$ for a plane and for a sphere of radius C. This takes advantage of the known general similarity of this shape to that which is required.

The value of C was fixed by requiring that the central ray should have a length to the point diametrically opposite the focus equal to the length along the ray $h=9$ out to the tangent at this point. This gave a function which was close enough to the required generator that it was used to span the whole range $0 \leq h \leq .8$ with excellent accuracy everywhere except in the small interval $.79 \leq h \leq .8$ and even here the accuracy was acceptable.

Summarizing then, the generating curve for the mean surface of this model was built up as follows: an approximately circular arc extending from $r=1$ to $r=.9$ as the lip then a transitional interval of straight segments from $.9 \geq r \geq .8$, and finally a smooth curve for the range $.8 \geq r \geq 0$.

The path lengths over the geodesics were then checked. The approximations were found to be good. Over the whole aperture, the path lengths were constant within ⅓ wavelength or less except in the very narrow range at $h=.79$ where the maximum error was ⅛ wavelength (for $r_0=4.75$ inches and a wavelength of 0.86 cm.).

The values of $y(r)$ to four significant figures, for the fifteen intervals between $r=.9$ to $r=.8$ mentioned above are tabulated below. $y'(r)$ is not constant. In tabulating $y(r)$, its value is given for the inner end of the interval i. e., the smallest value of $r$ in the interval, and additionally the value of $y(r)$ at the largest value of $r$ in the interval $I_1$ is given.

For the interval $.9 \geq r \geq .80$ ($I_1$ to $I_{15}$)

| Interval | $y(r)$ | at $r$ equals |
|---|---|---|
| $I_1$ | 0.1184 | [1] 0.90 |
| $I_1$ | 0.1318 | [2] 0.89 |
| $I_2$ | 0.1434 | 0.89 |
| $I_3$ | 0.1540 | 0.88 |
| $I_4$ | 0.1637 | 0.88 |
| $I_5$ | 0.1729 | 0.87 |
| $I_6$ | 0.1815 | 0.87 |
| $I_7$ | 0.1898 | 0.86 |
| $I_8$ | 0.1977 | 0.86 |
| $I_9$ | 0.2053 | 0.85 |
| $I_{10}$ | 0.2125 | 0.85 |
| $I_{11}$ | 0.2262 | 0.84 |
| $I_{12}$ | 0.2392 | 0.83 |
| $I_{13}$ | 0.2515 | 0.82 |
| $I_{14}$ | 0.2632 | 0.81 |
| $I_{15}$ | 0.2743 | 0.80 |

[1] Largest value of $r$ in $I_1$.
[2] Least value of $r$ in $I_1$.

$y(r)$ for the outer interval between $r=1$ and $r=0.9$ is readily calculated from $y=f_1(r)$, and for the central region for $r$ less than 0.9 the value of $y(r)$ is given by the approximation for that interval already described.

The curve thus obtained is to be the mean between two generating curves (generating the desired metallic surfaces whose normal separation, or distance apart measured normally to the curves, is constant; and preferably less than a half wavelength, in order to insure that only the minant mode is propagated between the parallel plates. r operation at 0.86 cm. (about .34 inch) free space erating wavelength, a separation of 4 mm. was selected. The generating curves for the metallic surfaces may now obtained. The radius $r_0$ was selected to be 4.75 in., ; curve is plotted up on a 16:1 scale, with $r_0=76$ in. A :at number of circles of 32 mm. radius are marked with :ir centers at close intervals on the curve. The upper 1 lower envelopes of these circles give the generating :ves for the metallic surfaces of which the curve is the :dian on a 16:1 scale. The envelope curves were read at ) equally spaced points and then plotted to 1:1 scale, :h $r_0=4.75$ in., and used to produce templates. The nplates were used to machine the desired surfaces on : lathe. The finally machined surfaces were made accurate to within about 5 mils.

[n the specific example, the radius of 4.75 inches was tated by available construction facilities. In general, he desired beam width is known, the required aperture given by $$A = \frac{k.x}{\text{beam width}}$$

ere $k$ is a factor depending on the illumination distribun from the primary feed, and where $x$ is the wavelength. t $\Delta r_0$ be the radial thickness of the added lip, i. e., $_1 = r_0 - \lambda r_0$. Then the overall diameter of the system $A + 2\Delta r_0 = 2r_0$. Also $A = 2\lambda r_0$. Then $\lambda$ is approximately $$\left(1 - \frac{\Delta r_0}{r_0}\right)$$

nsequently, for a desired aperture A, first select $\Delta r_0$ a convenient value, such that serious reflections may avoided. A value between one and two wavelengths ecommended. The value $r_0$ is then fixed by the equan $A + 2\Delta r_0 = 2r_0$. The parameter $\lambda$ is fixed by $A = 2\lambda r_0$. .s apparent that for the specific example the aperture s about 8.6 cm., or very nearly 24 wavelengths.

*Modifications (Figs. 8–11)*

Where the horn, such as terminates the waveguide feed of Fig. 1, provides an apparent point source subntially displaced from the circular aperture of the enna 8, the equations should be modified. Suppose focus to be at a point O' at radius $r'_0$ where $r'_0$ is ater than $r_0$. Then one should employ the equation:

$$\frac{hdr}{(r^2-h^2)^{1/2}} + 2\int_{\lambda r_0}^{r_0}\frac{h(1+y'^2)^{1/2}dr}{r(r^2-h^2)^{1/2}} +$$

$$2\int_h^{\lambda r_0}\frac{h(1+y'^2)^{1/2}dr}{r(r^2-h^2)^{1/2}} = \frac{\pi}{2} + \cos^{-1}\frac{h}{r_0}$$

(33)

:ead of Equation 11. $y$ between 0 and $\lambda r_0$ is determined satisfy the equation for all values of $h$ between 0 and The first integral represents the polar angle traced a ray in travelling from the apparent point of focus he aperture circle along a surface where $y'=0$. The h length equation can be similarly modified. A method of solution similar to that used in the case of the nplete surface of revolution mean surface, as for Fig. nay be employed as will be apparent to those skilled mathematics. This is simply equivalent to choosing $y$ an arbitrary function having $y'=0$ in the interval to $r_0$ and whatever is desired, as say the arc of a le for the interval $r_0$ to $\lambda r_0$ as before.

: is convenient, especially for multiple feed limited or scanning, to arrange the plates and the entrance rture so that the feed elements do not interfere with exit aperture (or conversely for received radiation, hat the receiving horn elements will not interfere with entrance aperture of the antenna). This may be accomplished by the device illustrated in Figs. 8 and 9. Here a lip portion 54 is folded under and extends $r=r$ in one angular region. The feed may be by the switch and rotating joint 40 (modified for the desired number of feed waveguides) to feed waveguides 55. Thus this lip portion has an entrance aperture facing the axis. A generating curve for this region folds back to join the domed portion 56 generating curve as an extension thereof. The entrance aperture is defined by the parallel metallic surfaces along the extremity of this extension at $r_1$. A further lip region 58 on the side diametrically opposite the axis serves as the exit aperture for radiation. The manner of calculating a mean surface which will focus all rays which pass into the dome portion 56 to meet these requirements is apparent from what has gone before. The requirement is:

$$h\int_{r_1}^{r_2}\frac{(1+y_1'^2)^{1/2}dr}{r(r^2-h^2)^{1/2}} + h\int_{\lambda r_0}^{r_2}\frac{(1+y_2'^2)^{1/2}dr}{r(r^2-h^2)^{1/2}} +$$

$$2h\int_h^{\lambda r_0}\frac{(1+y_3'^2)^{1/2}dr}{r(r^2-h^2)^{1/2}} + h\int_{\lambda r_0}^{r_3}\frac{(1+y_4'^2)^{1/2}dr}{r(r^2-h^2)^{1/2}} = \frac{\pi}{2} + \cos^{-1}\frac{h}{r_3}$$

(34)

for all $h$ less than $\lambda r_0$.

In this equation $y_1$, $y_2$ and $y_4$ are arbitrary predetermined functions which respectively conform to the desired generating curve for the entrance lip portion 54, the folded back portion 55 from the entrance lip portion 54 to the dome portion 56, and the exit lip portion 58. The radii $r_1$, $r_2$, and $r_3$ respectively are the radius to the entrance at the entrance lip portion 54, the maximum radius of the dome surface, and the maximum radius at which the exit lip portion terminates. The limit of integration $\lambda r_0$ is the maximum radius of the dome portion. In other words, the integration is extended over the predetermined functions $f_1(r)$, $f_2(r)$, and $f_4(r)$ which relate to the outer portions. The generating curve for the inner dome portion 56 is then determined to satisfy the equation for all $h$ less than $\lambda r_0$. In the embodiment just described one interesting feature is that if $r_1$ equals $\lambda r_0$ all radiation from the feed is collimated, because from Equation 1 for $r = r_1 = \lambda r_0$, $r_1 \sin \alpha_1 = \lambda r_0 \sin \alpha_1 = h$. Therefore, assuming all radiation from the feed is forward so that does not exceed 90°, all the rays are collimated since the focussing condition is met for all $h$ less than $\lambda r_0$.

The embodiment of Figs. 10 and 11 also is convenient for multiple feed limited sector scanning as the feed elements do not interfere with the exit aperture (for radiation purposes). The exit lip portion 58 may be as in Figs. 8 and 9. The entrance lip portion 60 is brought down to face axially. The energy is fed by a plurality of waveguides 55 having their terminations bent to direct the energy axially into the axially facing portion 60. The central completely rotationally symmetric dome portion 56 (indicated in dotted lines in Fig. 11) is modified, of course, to satisfy the requisite equations for its mean surface, as explained heretofore. In short, the integral $$h\int\left|\frac{(1+y'^2)^{1/2}dr}{r(r^2-h^2)^{1/2}}\right|$$

is extended over the entire range of the generating curve. However, for the central portion 56, the integral may be reduced to $$2h\int\frac{(1+y'^2)^{1/2}dr}{r(r^2-h^2)^{1/2}}$$

The added integrals for the entire range of $r$ are then made equal to $\pi/2 + \cos^{-1} h/r_3$, where $r_3$ is the radius at the exit aperture, by determining $y(r)$ to satisfy the equality for all $h$ in the central region between $h=\lambda r_0$ and $h=0$.

If the index of refraction throughout the space between the plates is different from unity, by reason of the energy being polarized normally to the axis or by reason of a dielectric of index different from unity being used throughout the space between the plates, the extended integral must be made equal to $$\frac{\pi}{2}+\cos^{-1}\frac{\mu h}{r}$$

where $\mu$ is the effective index of refraction between the plates. If $\mu$ is less than unity, the phase velocity being greater than in free space, which can be the case only for energy polarized with the electric vector normal to the axis, the resultant dome is found to be higher, and conversely if $\mu$ is greater than unity, the dome if less high, as pointed out hereinbefore.

It has been assumed that the dielectric ring 17, or spacers used, are substantially "invisible" to the radiation. If, however, there is one or more rings of dielectric which have an index of refraction enough different from the adjacent dielectric ring, the difference sohuld be taken into consideration. For this purpose, the integration may be divided into intervals for each of which $\mu$ is a constant. The index for each ring may be identified by a subscript, 1 for the first, 2 for the second, etc., thereby generalizing.

Then we proceed to evaluate the following integral over the curve:

$$\int \left| \frac{\mu_h h\, (1+y'^2)^{1/2} dr}{r(\mu_i^2 r^2 - \mu_h^2 h^2)^{1/2}} \right|$$

where $\mu_h$ is the index of refraction at $h$, and $\mu_i$ is the index in the particular $i$th interval over which the integration is extended, evaluating first those outer portions where the curve $y(r)$ is a predetermined function of $r$, and adding an integral taken over the first outermost ring of the inner dome portion where the index of refraction is constant, and determining the function $y$ for that ring so that for all parameters $h$ of that ring, the sum equals $$\frac{\pi}{2}+\cos^{-1}\frac{\mu_1 h}{r}$$

where $\mu_1$ is the index of refraction for that ring. Next, using the $y$ so determined for that ring, evaluate the same integral for all the predetermined portions and for the first ring portion, add the integral for the next or second ring portion, determining $y(r)$ for ring portion so that the sum gives $\pi/2+\cos^{-1} \mu_2 h/r$ for all $h$ in the second ring and $\mu_2$ having then the value of the effective index of refraction for the second ring, and so on till all rings have been accounted for and the shape of the entire central dome portion determined.

Summary

The invention thus discloses a scan antenna of the parallel plate surface of rotation type. The plates or metallic bodies have parallel metallic surfaces between which the energy is guided. The central portion is dome shaped and is a complete surface of revolution of the curve $y(r)$ about the $y$ axis where $r$ is the radial distance from the axis. The central portion, or the curve $y(r)$, extends to some particular radius $\lambda r_0$. On one side of the axis, the rotational surface beyond the radius $r=\lambda r_0$, is a surface of revolution for at least a section, generated by a predetermined function for the extension, and at the termination of the extension of $y(r)$ which generates the mean surface on this side, the tangent of $y(r)$ at its extremity is normal to the $y$ axis. Thus an aperture is defined by the metallic bodies over the arc generated by this extremity which aperture faces away from and is coextensive with the arc generated by the said termination. On the opposite side of the axis from the first side, $y(r)$ has an extension or portion beyond $\lambda r_0$ which is also a predetermined function of $y(r)$. The second extension also generates, at least for a limited sector, a surface of revolution which is the mean surface between the metallic surfaces. However, this second predetermined extension may be different from the first, that is, $y(r)$ for this portion is not the mirror image about the $y$ axis for the first extension. The termination of this second extension generates an arc over which the metallic surfaces define a second aperture. The apertures lie on different circles and either $y(r)$ must be different for the extremes of the two extensions, or $r$ must be less than for the second extension than for the first, to avoid interference of the pattern from the antenna by the feeds (or receptors). The second aperture may face away from the axis, toward the axis, or intermediate these, as axially. If the second aperture faces toward the axis, a particularly desirable condition is to make the $r$ for the second extremity and aperture equal to the extreme radius $r$ for the central complete surface of revolution dome portion, which is therefore symmetrical about the $y$ axis. The generating curve for this central portion is uniquely determined for the selected extension generating portions to cause the integral $$\int \left| \frac{h(1+y'^2)^{1/2} dr}{r(r^2-h^2)^{1/2}} \right|$$

between the extreme values of $r$ for said second extension of $y$ to $r_0$, the extreme value of $r$ for said first aperture or first extension of $y$ to be equal $$\frac{\pi}{2}+\cos\frac{\mu h}{r_0}$$

where $\mu$ is the effective dielectric constant in the space between the plates, all values of $h$ for which $h$ is less than $\lambda r_0$. The parameter $h$ is always taken positive. The manner of determining the requisite mean surface where one or more rings of dielectric are included between the metallic surfaces coaxially with the axis of revolution has also been disclosed.

What is claimed is:

1. A scan antenna comprising a pair of metallic bodies having parallel dielectrically separated surfaces, the median surface between said parallel surfaces having a central dome portion which is a complete surface of revolution about the $y$ axis of a curve $y(r)$ a function of $r$ for $|r|<\lambda r_0$, where $r$ is the radial distance from said axis so that $y(r)$ and $r$ are rectangular coordinates and $\lambda r_0$ is a specified value of $r$ less than $r_0$; and for a limited sector the said median surface including the surface of revolution of the curve $y(r)$ beyond $|r|=\lambda r_0$ to the extreme value $r_0$ on one side of said axis, said extension being a predetermined function with a tangent normal to said axis at the extension extremity remote from said axis, the metallic surfaces defining over the arc generated by said extremity a corresponding first aperture facing away from said axis, and on the side of said axis opposite the first sector and first aperture, the said medium surface is a surface of revolution of a second predetermined extension of the curve $y(r)$, the metallic surfaces defining over the arc generated by the extremity of said second extension remote from said axis a corresponding second aperture which second aperture is the entrance aperture for energy to be radiated and the exit aperture for energy to be received, at least one of the dimensions $r$ and $y(r)$ for the extremity of said second extension being different from the corresponding dimensions $r$ and $y(r)$ for the extremity of said first extension, whereby a feed or reception antenna element may be rotated completely about said axis to feed to or receive energy from said second aperture when adjacent thereto without interfering with radiation from or reception to said first aperture.

2. The antenna claimed in claim 1, the said second aperture facing in a direction parallel to said axis.

3. The antenna claimed in claim 1, the said second aperture facing toward said axis.

4. The antenna claimed in claim 1, the radius of said second aperture being equal $\lambda r_0$, said second aperture facing toward said axis.

5. The antenna claimed in claim 1, the difference $r_0-\lambda r_0$ being between about one and two wavelengths at a predetermined operating frequency.

6. The antenna claimed in claim 1, the separation of d surfaces being less than a half wavelength at a predetermined operating frequency.

7. An antenna comprising a pair of metallic bodies having parallel dielectrically separated surfaces, the median surface between said parallel surfaces having a central dome portion which is a complete surface of revolution about the y axis of a curve $y(r)$ a function of $r$ for $<\lambda r_0$, where $r$ is the radial distance from said axis, so that $y(r)$ and $r$ are rectangular coordinates, and $\lambda r_0$ is a specified value of $r$ less than $r_0$; and for at least a limited sector, the said median surface is the surface of revolution of an extension of the curve $y(r)$ beyond $|r|=\lambda r_0$ on one side of said axis, said extension being a predetermined function of $y(r)$ with a tangent normal to said axis $r_0$ the extension extremity remote from said axis, the metallic surfaces defining over the arc generated by said extremity a corresponding first aperture facing away from said axis which first aperture is an exit aperture for energy radiated from the antenna and an entrance aperture for energy received by the antenna; and on the side of said axis opposite the first section and first aperture, the said median surface is a surface of revolution of a second predetermined extension of the curve $y(r)$, the metallic surfaces defining over the arc generated by the extremity of said second extension remote from said axis a corresponding second aperture which second aperture is the entrance aperture for energy to be radiated and the exit aperture for energy to be received, the said function $y(r)$ being determined to collimate those energy rays passing between said plates from said second aperture which pass through any part of said central portion, whereby the greater portion of energy directed to enter said second aperture is collimated at said first aperture, and collimated energy entering said first aperture is brought substantially to a point focus at said second aperture, each of said arcs extending over a limited sector only, and at least one of the values $y(r)$ and $r$ for one of said extremities being different from those for the other extremity, whereby an element rotated about said axis along a circular path in juxtaposition to said second aperture, may continue its rotation without interference with said first aperture.

8. An antenna comprising a pair of metallic bodies having parallel dielectrically separated surfaces, the median surface between said parallel surfaces having a central dome portion which is a complete surface of revolution about the y axis of a curve $y(r)$ a function of $r$, for $<\lambda r_0$, where $r$ is the radial distance from said axis, so that $y(r)$ and $r$ are rectangular coordinates and $\lambda r_0$ is a specified value of $r$ less than $r_0$; and for at least a limited sector, the said median surface including the surface of revolution of an extension of the curve $y(r)$ beyond $=\lambda r_0$ on one side of said axis, said extension being a predetermined function with a tangent normal to said axis at the extension extremity remote from said axis, the metallic surfaces defining over the arc generated by said extremity a corresponding first aperture facing away from said axis, and on the side of said axis opposite the first sector and first aperture, the said median surface is a surface of revolution of a second predetermined extension of the curve $y(r)$, the metallic surfaces defining over the arc generated by the extremity of said second extension remote from said axis a corresponding second aperture, which second aperture is the entrance aperture for energy to be radiated and the exit aperture for energy to be received, the said function $y(r)$ being determined so that $$\int \frac{\mu_h h(1+y'^2)^{1/2}dr}{r(\mu_i^2 r^2 - \mu_h^2 h^2)^{1/2}} = \frac{\pi}{2} + \cos^{-1}\frac{\mu_h h}{r_0}$$

for the integral evaluated over the entire surface from the extreme value of $r$ for said second aperture to $r_0$, the extreme value of $r$ for said first aperture for any and all values of $h$ for which $|h|<\lambda r_0$, where $\mu_h$ is the particular effective index of refraction at any radius $r=h$, and $\mu_i$ is the effective index of refraction over the $i$th interval of integration, one extremity having at least one of the values of $r$ and $y(r)$ different from those for the other extremity, whereby an antenna element rotated completely about said axis along a circular path in juxtaposition to said second aperture, may continue its rotation without interference with radiation from or to said second aperture.

9. The antenna claimed in claim 8, the value $y(r)$ for the second said extremity being different for the value $y(r)$ for the first.

10. The antenna claimed in claim 8, the value $r$ for one said extremity being different from that for the other.

11. The antenna claimed in claim 8, the said second aperture facing in and in the general direction of concavity of said surface a direction parallel to said axis, the value $r$ for said second extremity being about equal to the value $\lambda r_0$, and the value $y(r)$ for said second extremity being different from $y(r_0)$ for said first extremity.

12. The antenna claimed in claim 8, the said second aperture facing toward the said axis, the said second extension being curved in the direction of concavity of said dome portion, and the said second extremity having a value $r$ less than the value $r_0$.

13. The antenna claimed in claim 12, said second extremity having value $r$ being equal to $\lambda r_0$.

References Cited in the file of this patent

UNITED STATES PATENTS

| | | |
|---|---|---|
| 2,576,182 | Wilkinson | Nov. 27, 1951 |
| 2,653,239 | Chu | Sept. 22, 1953 |

OTHER REFERENCES

Journal of Applied Physics, vol. 19, September 1948, pp. 860–862.